(12) United States Patent
Kingsford et al.

(10) Patent No.: US 7,083,157 B2
(45) Date of Patent: Aug. 1, 2006

(54) VALVE WITH LOCK-OUT MECHANISM AND METHOD OF USING THE SAME

(75) Inventors: Kenji A. Kingsford, DeVore, CA (US); David R. Martinez, Corona, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 50 days.

(21) Appl. No.: 10/928,714

(22) Filed: Aug. 26, 2004

(65) Prior Publication Data

US 2006/0043324 A1 Mar. 2, 2006

(51) Int. Cl.
*F16K 35/00* (2006.01)

(52) U.S. Cl. ............. 251/109; 251/107; 251/89
(58) Field of Classification Search ............ 251/89–93, 251/101, 107, 109, 111, 114–116
See application file for complete search history.

(56) References Cited

U.S. PATENT DOCUMENTS 2,325,802 A * 8/1943 Schmidt et al. ............. 137/583
3,516,432 A * 6/1970 Preising

* cited by examiner

Primary Examiner—J. Casimer Jacyna
(74) Attorney, Agent, or Firm—Chi Suk Kim (57) ABSTRACT

A valve assembly includes a valve body having a fluid chamber and a fluid inlet and fluid outlet. A poppet assembly is movably disposed within the chamber and includes a poppet head. The chamber includes a valve seat and is interposed between the fluid inlet and outlet. An actuator is attached to the poppet assembly. A lock-out mechanism is connected with the actuator for placing the valve into a closed position with the poppet head positioned against the valve seat. The lock-out mechanism includes a shaft member that is movably attached to the valve apparatus. When the shaft member is in a first position, the actuator is permitted to cause desired poppet assembly movement with the valve. When the shaft member is in a second position, the actuator and poppet assembly position within the valve is fixed with the poppet head seated against the valve seat.

33 Claims, 3 Drawing Sheets

VALVE WITH LOCK-OUT MECHANISM AND METHOD OF USING THE SAME

FIELD OF THE INVENTION

The present invention relates generally to valves useful in controlling the transport of fluid within a fluid handling system and, more particularly, to valves that are specially configured to include a lock-out mechanism to override unwanted valve actuation and methods for using the same.

BACKGROUND OF THE INVENTION

In chemical processing industries, such as the semiconductor industry, pneumatic and other types of actuated valves are typically used to distribute and/or control the flow of process liquids and gases from one location to another or from one piece of process equipment to another. From time to time, the equipment which is fed by fluid flowing through such valves must be shutdown, isolated, and taken out of service for maintenance, upgrading, or other reasons. For safety reasons, when such equipment is taken out of service, it is desirable that it be isolate from the process fluid normally flowing to it.

While many valves placed in such service are designed having a fail-closed feature. Due to the oftentimes aggressive chemical nature of the process fluids being used in many fluid transport applications it is usually not enough to simply rely on the fail closed feature of the valve to ensure that flow of liquid through it will not occur. Therefore, the task of isolating a downstream piece of equipment can be problematic if a secondary valve, e.g., a block valve, is not already installed within the fluid transport system.

Additionally, in the event that the valve is a three-way valve providing outlet fluid flow to two different pieces of equipment, the situation of isolating the piece of equipment must be handled in a manner that will enable it to be isolated while also permitting the value to continue its distribution of fluid to the other in service downstream device.

As briefly mentioned above, one solution that has been used to address the foregoing problem is to add one or more secondary valves, especially manually actuated valves, in line with the pneumatic valve. Such secondary valve can be installed upstream or downstream from valve, in the event that the valve has a single inlet and single outlet, or can be installed downstream from the valve in the event that the valve have more than one outlet and it is desired that one of the outlet feed stream remain on line. The secondary valves are manually closed to isolate the out-of-service equipment to ensure closure of fluid flow from the valve. When three-way fluid transport valves are used, the secondary valves may be placed on both fluid outlets to allow their respective pieces of equipment to be manually blocked in.

The use of such secondary valves is undesirable for several reasons. First, if the fluid flow system does not already have such valves in place, it is an additional cost in terms of the valves themselves, their installation, and the process down time to have the valves installed. Second, the presence of such secondary valves in a fluid transport system tends to increase the frictional losses within the system (even when they are wide open), thereby increasing the system pressure drop, reducing fluid transport efficiency and increasing pumping costs. Third, the secondary valves, like any other piece of fluid transfer equipment, requires maintenance that also contribute to increased capital and labor expenditures, and that can possibly contribute to unintended process shutdowns.

It is, therefore, desirable that a fluid transport valve be constructed in a manner that enables it to both function as an actuated valve to control fluid flow therethrough to a downstream fluid transport piece of equipment, while at the same time be capable of being operated or positioned into a closed or shut off position that is sufficiently reliable to enable the downstream piece of equipment to be isolated without the need for additional intervening secondary valves or the like. It is further desired that such fluid transport valve be configured in a manner that is space efficient, to permit its fitment within new and/or existing fluid transport systems without adversely impacting the same

SUMMARY OF THE PREFERRED EMBODIMENTS

A valve assembly constructed according to principles of this invention is constructed having a lock-out mechanism configured to override the actuator to fix the position of an actuator and poppet assembly within the valve to thereby prevent the flow of fluid through a fluid outlet.

Valve assemblies of this invention include a valve body having a fluid chamber disposed therein and a fluid inlet and fluid outlet in communication with the fluid chamber. The valve can be configured having more than one fluid outlet depending on the particular valve application. The valve includes a poppet assembly that is movably disposed within the chamber and that includes a poppet head interposed between the fluid inlet and fluid outlet. A valve seat is disposed within the chamber and is interposed between the fluid inlet and fluid outlet to control the flow of fluid through the chamber by placement of the valve head thereagainst. In the event that the valve is configured having two fluid outlets, the valve includes two valve seats. An actuator is attached to the poppet assembly to move the poppet head within the chamber relative to the valve seat.

A lock-out mechanism is attached to the valve assembly and connected with the actuator for overriding the actuator and placing the valve into a closed position with the poppet head positioned against the valve seat. The lock-out mechanism includes a shaft member that is movably attached to the valve apparatus. The shaft member includes an axial end positioned adjacent the actuator. When the shaft member is placed into a first position, the actuator is permitted to cause desired poppet assembly movement with the valve. When the shaft member is placed into a second position, the actuator and poppet assembly position within the valve is fixed with the poppet head seated against the valve seat.

BRIEF DESCRIPTION OF THE DRAWINGS

The valve assembly as constructed in accordance with the principles of this invention may be more readily understood by referring to the accompanying drawings in which.

Like numerals refer to like parts throughout the several views of the drawings.

DETAILED DESCRIPTION OF THE PREFERRED EMBODIMENTS

Figure 1:
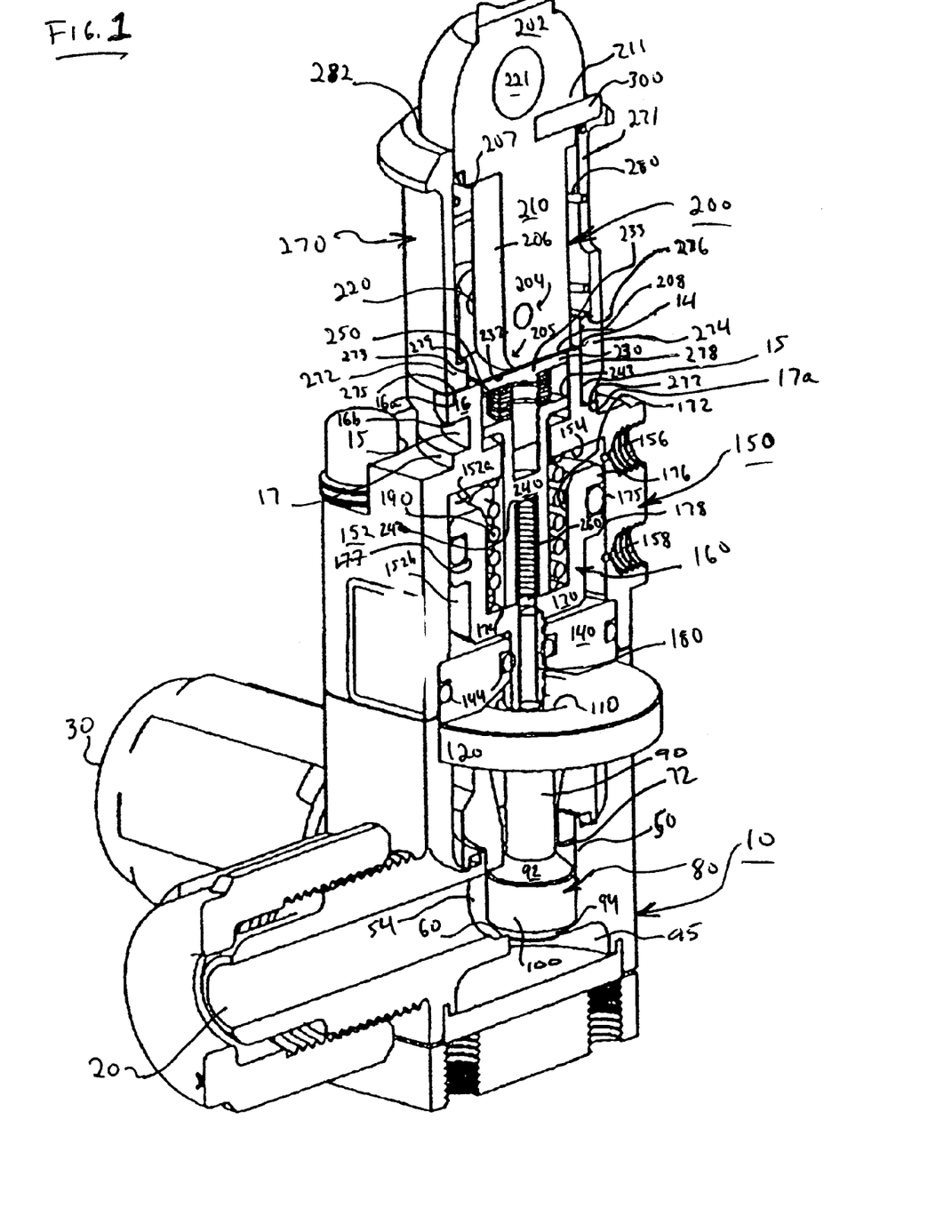
FIG. 1 is a perspective cross-sectional side view of a valve assembly including a lockout mechanism constructed in accordance with an example embodiment of the present invention, wherein the lock-out mechanism is illustrated in a locked position.
Figure 2:
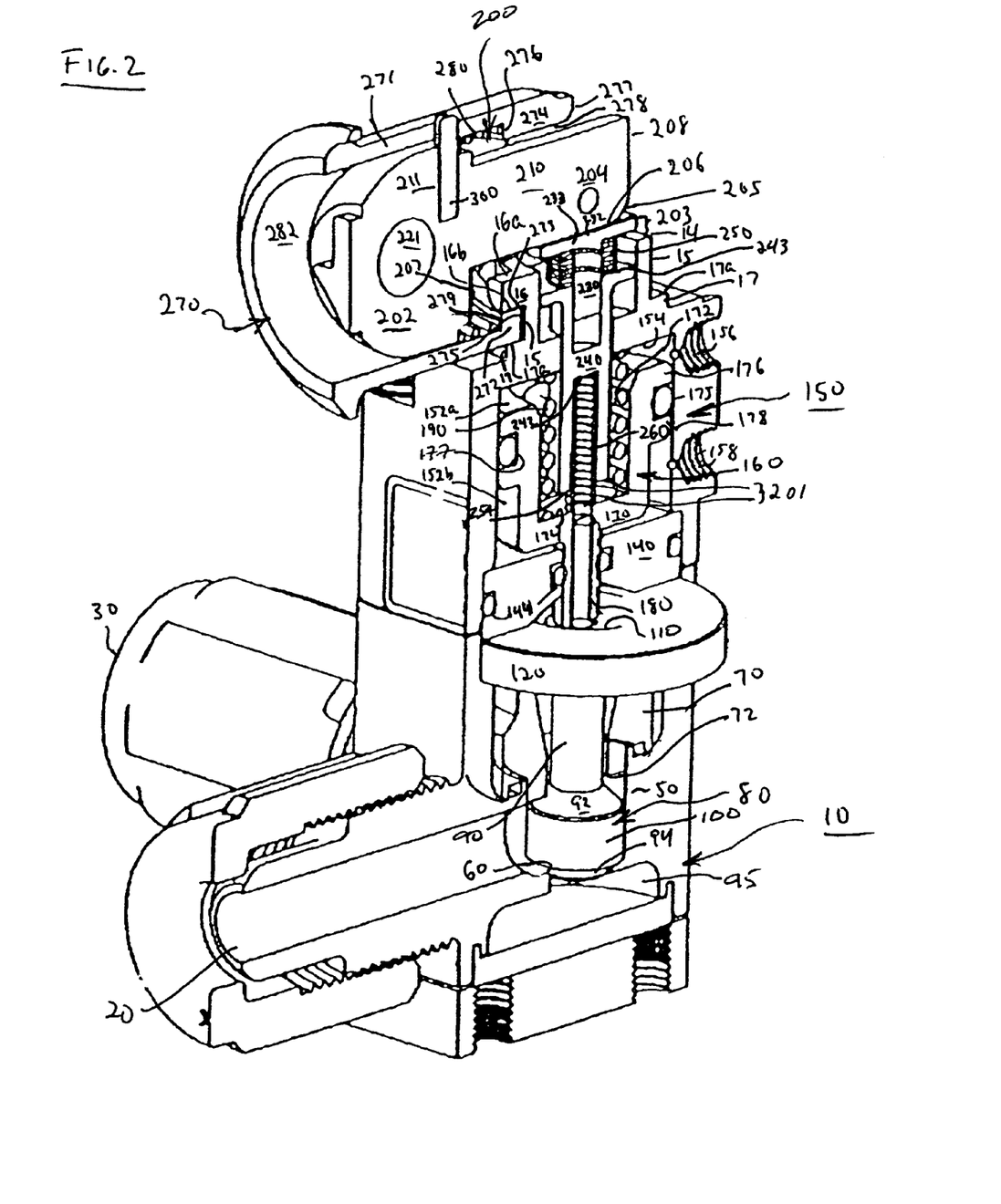
FIG. 2 is a perspective cross-sectional side view of the valve assembly of FIG. 1, with the lock-out mechanism illustrated in an unlocked position.
Figure 3:
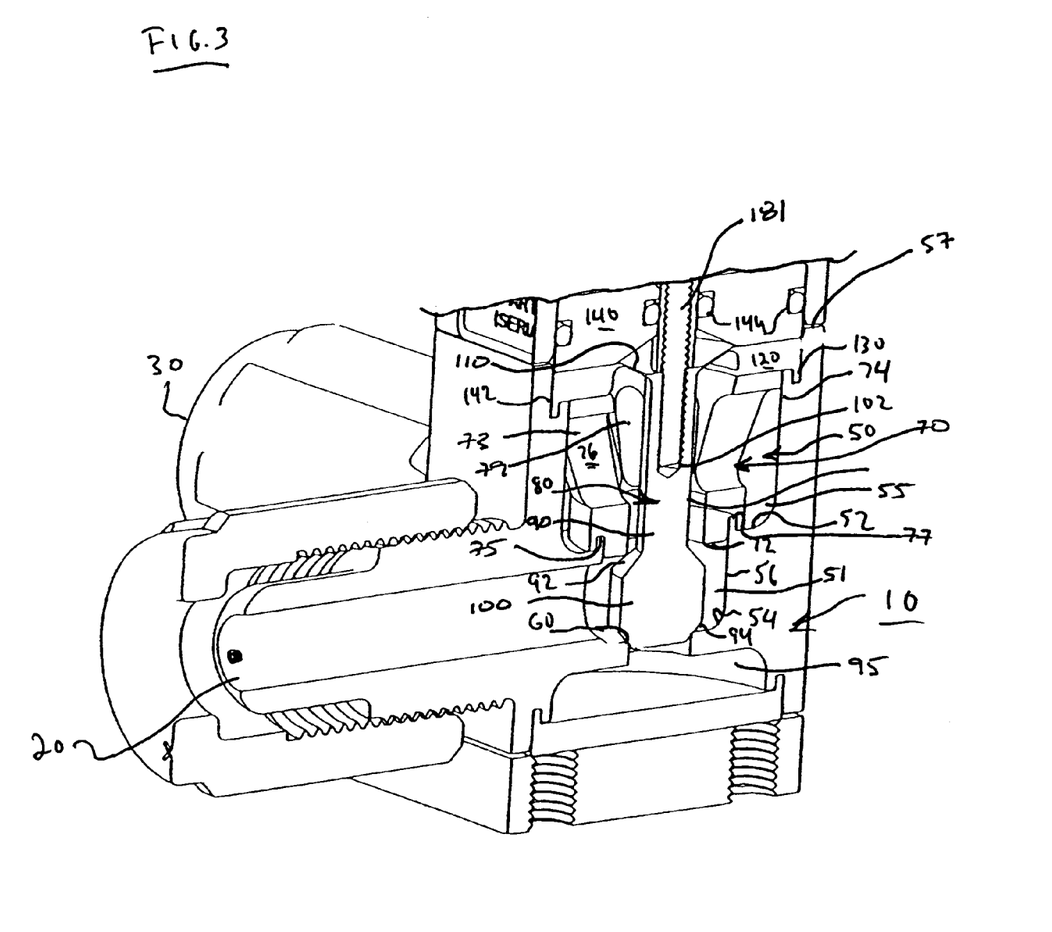
FIG. 3 is a perspective cross-sectional side view of a section of the valve assembly of FIGS. 1 and 2

Referring to FIGS. 1 to 3, a valve assembly for use with liquids or gases is described in accordance with an example embodiment of the present invention. Generally speaking, valve assemblies constructed according to the principles of this invention are configured having a lock-out mechanism connected to an actuator of the valve that can be operated to override the actuator to ensure that the valve assembly is placed in to a shut off or closed position when desired, e.g., to isolate a downstream piece of fluid transport equipment.

The valve assembly comprises a valve body, generally depicted as 10, an actuator 150 and a lock-out mechanism, generally depicted as 200. The actuator 150 is located in actuator housing 152 that is preferably connected to the valve body 10.

As best seen in FIG. 3, in an example embodiment the valve body 10 has a square-shaped outside surface. It is to be understood, however, that the valve body as used with valves of this invention may be configured having a number of different outside surfaces shapes such as cylindrical, hexagonal, octagonal or the like depending on such factors as size and packaging constraints as well as the final end use application.

The valve body 10 shown in FIGS. 1 to 3 is illustrative of a three-way valve comprising a fluid inlet 20, a first fluid outlet 30, a second fluid outlet (not shown) and a valve fluid chamber 50 in fluid communication with fluid inlet and outlets. Although a three-way valve having two fluid outlets is shown in this example embodiment, it is to be understood that valves constructed in accordance with the principles of this invention are not limited to any particular number of fluid inlets and/or outlets.

In this example embodiment, the fluid outlets are positioned apart from one another by approximately 180 degrees, and the fluid inlet is positioned approximately 90 degrees from each of the first and second fluid outlets. The particular placement of the fluid inlet and one or more fluid outlets will vary depending on the particular end use application. The fluid inlet 10 and fluid outlets are each configured with threaded wall portions to accommodate threaded connection to facilitate connection with conventional piping or tubing for carrying fluids to and from the valve.

As best shown in FIG. 3, the valve chamber 50 is preferably an integral part of the valve body, i.e., is made as part of the valve body, and is cylindrical in nature. The chamber includes a first section 51 that extends axially downwardly from a shoulder section 52 to a partially closed end 54. The shoulder section 52 and the partially closed end 54 are connected to one another by a cylindrical side wall 56.

The chamber 50 includes a second section 55 that extends axially upwardly within the valve body from the shoulder section 52 to a chamber open end 57. In a preferred embodiment the shoulder section and open end are connected to one another by a cylindrical side wall, and the chamber second section 55 is sized having a diameter that is greater than that of the chamber first section 51.

The valve body 10 includes a lower valve seat 60 that is disposed within the chamber first section 51, that extends circumferentially around the chamber partially closed end 54, and that faces upwardly towards the chamber second section 55. In a preferred embodiment, the lower valve seat 60 is an integral part of the valve body, i.e., is made as part of the valve body. As described below, the lower valve seat is sized to provide a desired leak-tight seal with an adjacent portion of a poppet assembly.

The valve body also includes an upper valve seat 72 that is disposed within the chamber first section and that is positioned around the chamber shoulder section 52. As described below, the upper valve seat is sized to provide a desired leak-tight seal with an adjacent portion of a poppet assembly. While a valve having two fluid outlets is described and illustrated for purposes of reference, it is to be understood that valves of this invention can be configured having only a single fluid outlet, in which case the valve can include a valve seat provided in the form of either the lower or upper valve seats described herein.

In a preferred embodiment, unlike the lower valve seat, the upper valve seat 72 is not provided as an integral part of the valve body. Rather, the upper valve seat 72 is provided as a surface feature of a separate element; namely, a valve insert 70. The valve insert 70 is disposed within the valve body and has a generally annular body 73 that is configured to fit predominately within the chamber second section 55.

The valve insert 70 comprises a first axial end that is defined along an inside diameter by the upper valve seat, and that also includes a groove 75 that is configured to provide a leak-tight seal with a tongue 77 that projects upwardly from the chamber shoulder section 52 to via a tongue-in-groove engagement. The insert 70 also includes an inside diameter that is configured to provide a desired degree of clearance between a portion of a poppet assembly to permit fluid flow therebetween. The insert 70 includes one or more fluid flow ports 79 that are configured to accommodate the passage of fluid from the chamber second section 51 to the fluid outlet 30. The insert 70 includes a second axial end that is positioned within the chamber second section adjacent the chamber open end 57.

While a valve comprising an upper valve seat separately installed in valve body and a lower valve seat integral with valve body has been described and illustrated, it is to be understood that valves constructed in accordance with the principles of this invention can include valve seats provided as separate or integral members of the valve body.

A poppet assembly 80 is disposed axially within valve chamber 50 for distributing flow from fluid inlet 20 to either of fluid outlets. The poppet assembly 80 comprises a poppet stem 90, a poppet head 100 at one end axial end of the stem, and a flexible diaphragm 110 at an opposite axial end of the stem. IN a preferred embodiment, the poppet head 100 is preferably imperforate. The head 100 includes upper and lower conical faces, 92 and 94, which are designed to seat against the upper valve seat 72 and the lower valve seat 60, respectively. In operation, when lower face 94 is seated against lower valve seat 60, as best seen in FIG. 3, fluid from inlet 20 is diverted to the first fluid outlet 30 via fluid flow port 79 in the insert 70. When the upper face 92 is seated against the upper valve seat 72, fluid from inlet 20 is diverted to the second fluid outlet (not shown) via fluid passage 95.

Referring to FIG. 3, the poppet assembly flexible diaphragm 110 is preferably integral with the poppet stem 90 and is designed to facilitate axial movement of the poppet stem and head within the valve body. The diaphragm 110 extends radially outwardly from the stem 90 and is defined along its peripheral edge by a flanged portion 120 that extends circumferentially therearound. In a preferred embodiment, the poppet assembly has a one-piece constructions, wherein the poppet stem, head, diaphragm and flange are each provided as integral parts of the assembly, i.e., are each formed from the same materials as a single part.

The flanged portion 120 includes an axially-downward projecting lip or tongue 130 at its outer edge. The valve body includes a groove 142 adjacent the chamber second section open end into which the lip 130 is inserted. Lip 130 and groove 142 are preferably designed to provide a leak-tight seal between the poppet assembly and valve body by tongue-in-groove engagement.

An annular ring 140 is mounted above the poppet assembly flange 120 in abutting engagement therewith and operates to secure engagement of the adjacent poppet assembly flange and valve body surfaces to ensure a desired leak-tight engagement therebetween. In an example embodiment, the annular ring is disposed predominantly within the actuator housing 150 that is connected with the valve body chamber second section open end 57. Alternatively, the annular ring can be configured for placement predominantly within the valve body. The actuator housing includes an actuator chamber having a shoulder section separating a first chamber section adjacent the valve body from a second chamber section extending to a partially-closed end of the actuator chamber, wherein the first chamber section has a diameter greater than the second section.

The annular ring 140 has an outside diameter sized to fit within the actuator first section and is held or loaded into place axially against annular ring by abutting placement of the shoulder section against an adjacent axial surface of the ring. The annular ring includes groves disposed circumferentially along both the outside and inside diameter surfaces, and respective sealing members, e.g., in the form of O-ring seals, are disposed within respective grooves to seal the annular ring from the actuator housing 152, along a ring outside diameter, and to seal the annular ring from an actuator shaft, along a ring inside diameter.

The valve body 10, valve insert 70, poppet assembly 80 and all other wetted parts and surfaces of the valve are preferably made from a material that displays properties of good chemical and thermal resistance. Such properties are desirable if the valve is to be used in such applications as the semiconductor manufacturing industry or in any other industry where corrosive chemicals are to be passed through the valve or where it is desirable that a high degree of chemical purity of the process chemical passed through the valve.

In a preferred embodiment, wetted parts or surfaces of the valve are formed from a fluoropolymer compound such as those selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. Particularly preferred materials are TEFLON® PFA or TEFLONS® FEP, which are provided by DuPont Company of Wilmington, Del. Such materials are desirable for this service because they are not damaged by corrosive, acidic, or caustic liquids and do not introduce contamination into chemically pure liquids.

Referring to FIGS. 2 and 3, the valve assembly of this embodiment further comprises an actuator 150 for moving the poppet assembly 80 within the valve body to distribute flow between the fluid inlet and the fluid outlets. Although for the example embodiment illustrated the use of a pneumatic actuator is preferred, a variety of other types of actuators can be used including electrically, hydraulically, or manually operated actuators. In this example embodiment, the actuator 150 is provided in the form of a piston member 160 that is movably positioned within the actuator chamber. The piston 160 includes a head 170 at one axial end, and a shaft 180 projecting a distance outwardly from the head.

The piston shaft 180 projects through the annular ring and includes a distal end that is in contact with the poppet assembly. As best shown in FIG. 3, in a preferred embodiment, the piston shaft 180 and poppet assembly are connected to one another through the use of a threaded stud 181. The threaded stud includes a first portion that is threadably engaged within a threaded central opening through the piston shaft 180, and includes a second portion that is threadably engaged with a through-bore 102 that extends axially within the poppet stem 100. Configured in this manner, the threaded shaft operates to fix the actuator piston shaft to the poppet assembly to facilitate axial movement of the poppet assembly in both directions.

The piston member includes a cylindrical wall surface extending a distance axially from the piston head and defining a spring cavity 172 therein. A piston biasing spring 190 is located in the spring cavity 172 and is interposed axially between an inner face 174 of the piston 170 and an inner surface 154 of the actuator housing 152 partially-closed end. The piston biasing spring 190 operates to impose a spring biasing force on the piston to urge it away from the actuator housing partially-closed end and towards the valve body 10. When the piston member is not otherwise actuated by pneumatic means, this spring biasing force operates to provide a fail-closed valve operation relative to preventing fluid flow through the valve to the second fluid outlet by maintaining engagement of the poppet head against the first valve seat.

The actuator housing 152 also includes upper and lower pneumatic flow ports 156 and 158. The pneumatic medium used to actuate the example valve assembly of this embodiment is preferably air. The piston wall surface includes a groove 177 disposed circumferentially along an outside surface that is defined by a pair of radially extending flanges 176 and 178. A seal member 175, e.g., provided in the form of an O-ring seal, is placed within the groove and for providing a leak-tight seal between the piston wall surface and the actuator chamber, and for defining the actuator chamber into upper and lower chamber portions 152a and 152b. Configured in this manner, the flow ports 156 and 158 operate to supply actuating air to respective upper and lower portions 152a and 152b of the actuator housing chamber.

When the valve assembly is unlocked and in its normal operating mode, a differential pressure is created within the actuator chamber upper portion 152a and lower portion 152b by adjusting the relative amounts of air supplied to upper port 156 and lower port 158. In the example embodiment illustrated in FIGS. 1 to 3, as the proportion of air supplied to the lower port 158 increases relative to that if any supplied to upper port 156, piston 160 will tend to move upward against the biasing force of piston biasing spring 190. In this way, the relative proportions of air supplied to upper port 156 and lower port 158 can be used to move poppet assembly 80 within the valve body to alternately seat the upper face 92 against upper valve seat 72 or to seat lower face 94 against lower valve seat 60. As a result, the valve can be pneumatically actuated to control the distribution of fluid flow between the first and second fluid outlets.

In accordance with this embodiment, the actuator housing 152, piston member 160, and annular ring 140 can each be formed from the same types of materials disclosed above for forming the wetted portions of the valve assembly, e.g., from a inert fluoropolymer such as TEFLON® PFA or TEFLON® FEP. Alternatively, since these parts of the valve assembly are not placed into wetted contact with the process fluid, they can be formed from any type of material having a desired degree of mechanical properties needed to form such structural members. For example, such parts can be formed from plastic and polymer materials other than fluoropolymers, or can be formed from metallic materials. The piston member biasing spring 190 is preferably made of metal, but if desired can be coated with an inert fluoropolymer such as those disclosed above.

As mentioned above, valve assemblies constructed in accordance with principles of this invention include a lock-out mechanism 200 that is configured to override the valve actuating means to ensure that the valve be maintained in a closed position. In an example embodiment, the lock-out mechanism 200 is connected to the actuator housing 152 and is configured, when operated, to connect with and override the actuator to place the valve into a secured locked out or closed condition. In the example embodiment, the lock-out mechanism is configured to provide two valve positions, locked and unlocked. FIG. 1 shows the valve assembly of this example embodiment in the locked position, while FIG. 2 shows the valve assembly of this example embodiment in the unlocked position.

In accordance with this example embodiment, the lock-out mechanism 200 mechanically overrides or restrains axial movement of the actuator so that air to ports 156 and 158 does not cause the actuator and thus poppet assembly movement. As a result, the poppet assembly head 100 can be locked into position with its lower conical face 94 seated against the lower valve seat 60. Thus, fluid flow to the second outlet can be mechanically prevented or restrained, eliminating or reducing the need installing or using secondary block valves or other mechanical means of isolating downstream equipment. The elimination of such other isolating means can reduce maintenance costs and improve hydraulic performance by reducing system pressure drop.

The lock-out mechanism 200 of the example embodiment illustrated in FIGS. 1 and 2 is generally one that provides the desired locked and unlocked valve condition by virtue of a pivoting or hinged movement. While this is indeed one configuration of providing an assembly capable of overriding the actuator of the valve, it is to be understood that other configurations of lock-out assemblies are possible. For example, the lock-out mechanism can be configured to provide the desired locking and unlocking valve condition by a turning, i.e., along its rotational axis, rather than by a hinged or pivoting operation. Again, a feature of the lock-out mechanism is that it be one that can be implemented to mechanically override the actuator. It is, therefore, understood that such other configurations lock-out mechanism capable of performing this function be within the scope and spirit of this invention.

The lock-out mechanism 200 comprises a shaft member 210, which preferably has an enlarged head 202 at an end of shaft member 210 that is distal the actuator. The shaft member 210 is pivotally connected to the actuator housing 152 by a pin 220 that is inserted thorough a pivot point opening 204 located adjacent an end of shaft member 210 that is opposite the head 202 and that is proximal to actuator housing 152.

In an example embodiment, the lock-out mechanism 200 also comprises first and second intermediate members 230 and 240 that are used to connect the shaft member to the actuator. It is to be understood that this is but one embodiment of elements that can be used to connect the shaft member to the actuator and that other embodiments comprising a different number and/or different types of intermediate elements are intended to be within the scope of this invention.

The first intermediate member 230 is generally located within cavity defined by a collar 15 that projects axially outwardly a distance from a top surface of the actuator housing 152. The first intermediate member 230 is configured having a first surface that contacts the end portion of the shaft member opposite the head 202, and a second surface that contacts an adjacent surface of the second intermediate member 240. In a preferred embodiment, the first intermediate member 230 is provided in the shape of a T-shaped member having a radially extending top section 232 contacting the shaft member and having an axially extending section contacting the second intermediate member.

The second intermediate member 240 is partially located within spring cavity 172 of piston head 170, and extends axially therefrom, through an opening in the partially closed end of the actuator housing and into the cavity defined by the collar. The second intermediate member is configured having a first end projecting into the collar cavity that is configured to connect with the first intermediate member, and a second end disposed within the spring cavity 172 that is configured to connect with the piston member head.

In a preferred embodiment, the second intermediate member 240 is provided in the shape of an H-shaped member having a opening disposed within its axial end projecting into the collar cavity. A spring biasing means 250 is interposed between the adjacent first and second intermediate member surfaces to provide a desired degree of preloading. In a preferred embodiment, the biasing means is provided in the form of Belleville washers that are disposed concentrically around the first intermediate member axially extending section and that are interposed between a top surface 243 of the second intermediate member and an underside surface of the first intermediate member radially extending top surface.

In a preferred embodiment, the H-shaped member includes an opening disposed within its axial end projecting into the spring cavity 172 and includes a biasing means 260 disposed therein the provide a desired degree of force urging the second intermediate member away from the piston head. In a preferred embodiment, the biasing means is provided in the form of a spring.

As indicated in FIGS. 1 and 2, the valve assembly of this embodiment is placed into a locked condition by moving the shaft member 210 from a first position to a second position. The first (unlocked) position is shown in FIG. 2. As the figure indicates, in the unlocked position the shaft member 210 is rotated in a direction away from the longitudinal axis of actuator 150. In an example embodiment, the lock-out mechanism is configured so that this unlocked position is obtained when the shaft member is rotated to a position that is substantially perpendicular to the longitudinal axis of actuator 150 to unlock the valve assembly. The second shaft member position, where the valve assembly is placed in a locked condition, is shown in FIG. 1. In the locked condition, the shaft member 210 is substantially in axial alignment with actuator 150.

Although a particular lock-out mechanism embodiment has been disclosed and illustrated, that provides a locked and unlocked condition when the shaft member is moved relative to the actuator axis, it is to be understood that lock-out mechanisms of this invention can alternatively be configured to provide locked and unlocked conditions when maintained in axial alignment with the actuator, e.g., by rotating or turning the shaft member along its rotational axis, and that such alternatives are understood to be within the scope of this invention. This alternative lock-out mechanism movement can be achieved by either configuring the distal end of the shaft member with a cammed surface that causes a locked condition by turning the shaft member, or by configuring the shaft so that it is threaded relative to an adjacent valve member to cause the shaft member to cause a locked condition by threaded engagement therebetween.

In the first "unlocked" position, the actuator 150 is unrestrained and is able to freely respond to differential air pressures in the upper and lower halves 152*a* and 152*b* of actuator housing 152 to effect desired actuator and poppet assembly movement within the valve. The shaft member 210 includes a side surface 206 and a bottom surface 208. The relative distances between the pivot point 204 and the side surface 206, and between the pivot point 204 and the bottom surface 208, are different thereby defining a cammed surface 205 adjacent the shaft end.

As shown in FIG. 2, when the valve assembly is unlocked, the side surface 206 abuts top surface 232 of first intermediate member 230. The shaft member is configured such that the dimension between the pivot point 204 and the side surface 206 is one that produces a sufficient distance between the second intermediate member and the piston member to permit axial displacement of the actuator. This distance is illustrated as a gap 201 that exists between an end 245 of the second intermediate member 240 and the inner surface 174 of the piston head 170. This gap 201 is sufficient to permit a desired range of actuator operation, when pneumatically actuated, to effect desired poppet assembly movement. Additionally, in this unlocked position, a gap 203 may exist between the side surface 206 of shaft member 210 and a top surface 14 of the collar 15. Whether this additional gap 203 exists or not is a function of the configuration of the collar, first and second intermediate members, and may or may not exist depending on the particular valve assembly construction.

When the valve assembly is unlocked, the gap 201 is maintained by the biasing action of inner spring 260, while any gap 203 is maintained by the combined biasing action of the inner spring 260 and the biasing means 250.

As the shaft member 210 is rotated upward to the locked position as shown in FIG. 1, the cammed surface 205 adjacent the end of the shaft member 210 exerts an increasing longitudinal force against top surface 232 of first intermediate member 230, which in turn exerts a longitudinal force against second intermediate member 240 via the biasing means As a result, the gap 201 and gap 203 are reduced, and gap 201 is preferably eliminated, once rotation is complete. When placed in the locked position of FIG. 1, the second intermediate member 240 abuts against the piston head 170 to override any pneumatic actuation of poppet assembly 80 that could cause the poppet assembly head 90 to move from its seated position against the lower valve seat 60, thereby preventing fluid flow to the second fluid outlet.

The valve assembly prepared according to principles of this invention includes a lock-out mechanism that is also configured to prevent unwanted movement of shaft member 210 from the locked position to the unlocked position. As shown in FIGS. 1 and 2, the lock-out mechanism 200 includes a sleeve 270 that is configured to house at least a portion of the shaft member 210. In an example embodiment, the sleeve 270 is movably connected to a top portion of the actuator housing, is movable relative to the shaft member, and is disposed concentrically around a portion of the shaft member. The sleeve is configured to releasibly retain the shaft member in its locked or unlocked position.

The shaft member includes a sleeve retention pin 300 that is disposed within a slot 211 positioned adjacent the shaft head 202, and that projects radially outwardly a distance therefrom. The sleeve includes a groove 271 that extends a distance from a sleeve axial end adjacent the shaft member head 202, and that is configured to accommodate slidable movement of the pin therein, thereby providing a movable connection between the sleeve and shaft member. In a preferred embodiment, the sleeve groove 271 extends longitudinally along sleeve 270 a determined distance to allow the sleeve 270 to slidably move with respect to shaft member 210 and pin 300 a sufficient distance to enable the shaft member to be moved from a locked to an unlocked position. Configured in this manner, the pin 300 movably connects the sleeve 270 and shaft member 210 together.

In a preferred embodiment, the sleeve 270 is cylindrical in shape and is configured having an axial length that will facilitate pivoting movement of the shaft member, and slidable movement of the sleeve about the shaft member, between the locked and unlocked positions atop the actuator housing. In the example embodiment illustrated, the sleeve is configured having an axial length in one region of its circumference positioned along the pivot direction of the shaft member that different than other regions. In a preferred embodiment, the sleeve has an axial distance, along a circumferential region extending from an axial end adjacent the shaft member head 202 to a projection 16 on the collar 15 that is less than that of a diametrically opposed circumferential region. This differential sleeve length is provided to facilitate lateral movement of the sleeve vis-a-vis the actuator housing with the shaft member 210 to lock and unlock the valve assembly.

As shown in the figures, the sleeve 270 preferably has an open end 282 that is distal from actuator housing 152. In an example embodiment it is desired that the axial sleeve length and/or axial shaft member length be such that when in a locked position a portion of the shaft member enlarged head 202 protrudes from open end 282. This is desired to provide a visual indication to a user that the valve is locked out.

As shown in FIGS. 1 and 2, the sleeve 270 has a radially inwardly projecting lip at its end adjacent the actuator housing 152. A first region of the lip 272 is positioned along a circumferential region of the sleeve in the direction of lock-out mechanism rotation section, and includes an inner face 273, a top face 279, and a bottom face 275. A second region of the lip 274 is positioned diametrically opposed from the first region of the lip and includes an inner face 278, a top face 276, and a bottom face 277. In an example embodiment, the second region of the lip 274 positioned diametrically opposed from the projection 16 on collar 15, and the first region of the lip 272 is positioned proximate the projection 16 to provide abutting engagement in the manner described below.

A sleeve biasing spring 280 is positioned concentrically around a portion of the shaft member and is interposed axially between an inner face 207 of the shaft member enlarged head 202 and the top surfaces 279 and 276 of sleeve inwardly projecting lip. As shown in FIG. 1, when the valve assembly is locked, the sleeve biasing spring 280 exerts a force against top surfaces 276 and 279 of the sleeve inwardly projecting lip, thereby forcing the sleeve 270 axially downward towards actuator housing 152 and operating to resist unwanted pivoting movement of the shaft member. In the locked position, the bottom surface 277 of sleeve inwardly projecting lip portion 274 preferably abuts a top surface 17*a* of a collar flange 17, and bottom surface 275 of sleeve inwardly projecting lip portion 272 preferably abuts a top surface 16*a* of the outwardly projecting lip 16. This biasing action forces the sleeve 270 downward in a direction towards actuator housing 152, thereby causing at least a portion of the shaft member enlarged head 202 to protrude through open end 272 of sleeve 270.

As shown in FIGS. 1 and 2, in an example embodiment, the shaft member enlarged head 202 includes an aperture 221 projecting radially therethrough. A locking device, such as a chain, an elongated member or a padlock, can be inserted through aperture 221 to prevent the upward movement of sleeve 270 with respect to shaft member 210, thereby preventing unwanted movement of the shaft member 210, and the lock-out mechanism, from the locked to the unlocked position.

With the exception of the Belleville washers 250, sleeve biasing spring 280, and inner spring 260, the remaining elements forming the lock-out mechanism 200 are preferably formed from the same types of suitable structurally rigid materials described above for forming the actuator housing and other non-wetted parts of the valve assembly. If desired, the Belleville washers 250, sleeve biasing spring 280, and inner spring 260 can each be coated with a inert material such as one of the fluoropolymers described above.

To place the valve assembly of this embodiment in the unlocked position, the shaft member 210 and sleeve 270 are rotated in a direction away from the longitudinal axis of actuator 150, and more preferably from the position shown in FIG. 1 to the position shown in FIG. 2. In this example embodiment, the movement is approximately 90 degrees. To unlock the valve, the user must first pull the sleeve 270 upwards to permit the pivoting of the sleeve 270 and shaft member 210 to the unlocked position. As the sleeve 270 is moved relative to the shaft member, the shaft member pin 300 is moved within the sleeve groove 271.

As the sleeve and shaft are pivoted, the sleeve inwardly projecting lip portion 272 is rotated past the outward projection 16, and the biasing force of the sleeve biasing spring 280 pushes the sleeve inwardly projecting lip portion 272 into abutting engagement with the collar 15, top surface 17a of the collar flange 17, and the bottom surface 16b of the outward projection 16. The distance between the collar 15 and the shaft member inner face 207 when the valve assembly is in the unlocked position is shorter than the distance between top surface 16a of outward projection 16 and the shaft member inner face 207 when the valve assembly is in the locked position. As a result, the sleeve 270 preferably encloses the shaft member enlarged head 202 therein when the valve assembly is unlocked. In addition, the engagement of the shaft pin 300 with the sleeve groove 271 allows the sleeve 270 to slidably move with respect to shaft member 210. Thus, when the valve assembly is unlocked, enlarged head 202 is not visible, giving a visual indication of its unlocked status.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A valve apparatus for controlling fluid flow comprising:
a valve body having a fluid chamber disposed therein and including a fluid inlet and a fluid outlet in communication with the fluid chamber;
a poppet assembly movably disposed within the fluid chamber and including a poppet head that is interposed between the fluid inlet and the fluid outlet;
a valve seat disposed within the fluid chamber and interposed between the fluid inlet and the fluid outlet to control the flow of fluid through the fluid chamber by placement of the poppet head thereagainst;
an actuator attached to the poppet assembly to move the poppet head within the fluid chamber relative to the valve seat; and
a lock-out mechanism connected with the actuator for placing the valve apparatus into a closed position with the poppet head positioned against the valve seat, the lock-out mechanism comprising:
a shaft member movably attached to the valve apparatus and having a shaft member end positioned adjacent the actuator;
wherein the shaft member is configured to allow actuator movement when placed into a first position to permit fluid flow through the valve apparatus and to fix actuator and poppet assembly movement when placed into a second position to position the poppet head against the valve seat; and
wherein the shaft member is pivotably attached to the valve apparatus adjacent the shaft member end, and wherein the shaft member end has a cammed surface to provide a space from the actuator when the shaft member is in the first position, and to eliminate the space when the shaft member is pivoted into the second position.

2. The valve apparatus as recited in claim 1 wherein the lock-out mechanism further comprises a sleeve movably disposed concentrically around the shaft member and having a sleeve end positioned adjacent the valve apparatus, the sleeve releasibly fixing the shaft member into the first and second positions.

3. The valve apparatus as recited in claim 2 wherein the shaft member includes an enlarged head at an end opposite the shaft member end positioned adjacent the actuator, and wherein the lock-out mechanism further includes a biasing means disposed within the sleeve to bias the sleeve end against the valve apparatus.

4. The valve apparatus as recited in claim 2 wherein the shaft member includes an opening disposed radially therethrough adjacent an end opposite from the shaft member end positioned adjacent the actuator; and wherein the sleeve has a length that enables the opening to be accessed when the shaft member is placed into the second position.

5. The valve apparatus as recited in claim 1 wherein the actuator is disposed within an actuator housing connected to the valve body, wherein the shaft member is pivotably attached to the actuator housing, wherein the shaft member is placed into the first position when the shaft member is moved out of axial alignment with the actuator, and is placed into the second position when the shaft member is moved into axial alignment with the actuator.

6. The valve apparatus as recited in claim 1 wherein the poppet assembly comprises a one-piece construction including an integral stem that extends axially a distance from the poppet head, a flexible diaphragm that is integral with the integral stem and that extends a distance radially therefrom to facilitate axial poppet head movement, and a flange integral with the flexible diaphragm and extending circumferentially therearound, the flange including a lip for providing a leak-tight seal with the valve body.

7. The valve apparatus as recited in claim 1 wherein the poppet head is imperforate.

8. The valve apparatus as recited in claim 1 wherein the valve body, the poppet assembly, and the valve seat are formed from a non-metallic material.

9. The valve apparatus as recited in claim 1 further comprising:
a first intermediate member positioned adjacent the actuator; and a second intermediate member interposed between the first intermediate member and the shaft member;

wherein a connection between the shaft member and the actuator is provided via the first and second intermediate members.

10. The valve apparatus as recited in claim 9 wherein a spring is interposed between the first intermediate member and the actuator and a spring biasing means is interposed between the first and second intermediate members.

11. The valve apparatus as recited in claim 1 further comprising a second valve seat, wherein the valve seat is integral with the valve body and formed from a section of the fluid chamber, and the second valve seat is non-integral with the valve body and is provided as a section of an insert that is positioned within the fluid chamber.

12. The valve apparatus as recited in claim 11 wherein the valve body includes a second fluid outlet, and wherein the insert includes a fluid flow passage that is in fluid flow communication with one of the fluid outlet or the second fluid outlet.

13. A valve apparatus for controlling fluid flow comprising:
a valve body having a fluid chamber disposed therein and including a fluid inlet and a fluid outlet in communication with the fluid chamber;
a poppet assembly movably disposed within the fluid chamber and including a poppet head that is interposed between the fluid inlet and the fluid outlet;
a valve seat disposed within the fluid chamber and interposed between the fluid inlet and the fluid outlet to control the flow of fluid through the fluid chamber by movement of the poppet head thereagainst;
an actuator housing connected to the valve body and including an actuator movably disposed therein and connected with the poppet assembly to move the poppet head within the fluid chamber relative to the valve seat to control fluid flow; and
a lock-out mechanism disposed adjacent the actuator housing for connecting with the actuator to fix the valve apparatus into a closed position with the poppet head positioned against the valve seat, the lock-out mechanism comprising:
a shaft member having an axial end positioned to connect with the actuator and that is pivotably attached to the valve apparatus, the shaft member proximate to the axial end having an adjacent cammed surface to permit actuator movement and fluid flow through the valve apparatus when the shaft member is placed into a first position and to fix actuator and poppet assembly movement when the shaft member is placed into a second position to place the poppet head against the valve seat; and
a sleeve member disposed around the shaft member and axially movable relative to the shaft member to releasibly fix the shaft member in the first and second positions, the sleeve member having an axial end movably positioned adjacent the actuator housing.

14. The valve apparatus as recited in claim 13 wherein the shaft member adjacent the axial end of the shaft member includes a pin that is disposed therethrough for providing the pivotable attachment, and wherein a distance between the pin and a shaft member side surface adjacent the axial end is less than a distance between the pin and an end surface of the axial end of the shaft member.

15. The valve apparatus as recited in claim 14 wherein the first position occurs when the shaft member is displaced from axial alignment with the actuator, and wherein the second position occurs when the shaft member is placed in axial alignment with the actuator.

16. The valve apparatus as recited in claim 13 wherein the lock-out mechanism further includes a spring disposed within the sleeve member to bias the sleeve member towards the actuator housing.

17. The valve apparatus as recited in claim 13 wherein the lock-out mechanism further includes a guide mechanism interposed between the shaft member and sleeve member to maintain the shaft member and the sleeve member in alignment with one another when the shaft member is moved between the first and second positions.

18. The valve apparatus as recited in claim 13 further comprising;
a first intermediate member positioned adjacent the actuator; and
a second intermediate member interposed between the first intermediate member and the shaft member, wherein a connection between the shaft member and actuator is provided through the first and second intermediate members.

19. The valve apparatus as recited in claim 18 further comprising a spring interposed between the first intermediate member and the actuator, and a spring biasing means interposed between the second intermediate member and the first intermediate member.

20. The valve apparatus as recited in claim 13 wherein the poppet assembly comprises a one-piece construction including an integral stem that extends axially a distance from the poppet head, a flexible diaphragm that is integral with the integral stem and that extends a distance radially therefrom to facilitate axial poppet head movement, and a flange integral with the flexible diaphragm and extending circumferentially therearound, the flange including a lip for providing a leak-tight seal with the valve body.

21. The valve apparatus as recited in claim 20 wherein the poppet head is imperforate.

22. The valve apparatus as recited in claim 13 wherein the valve body, the poppet assembly, and the valve seat are formed from a non-metallic material.

23. The valve apparatus as recited in claim 20 further comprising an annular ring that is interposed between the poppet assembly and the actuator, and that imposes a desired loading force onto the flange to maintain engagement of the lip with the valve body.

24. The valve apparatus as recited in claim 13 wherein the shaft member includes a second axial end opposite the axial end positioned to connect with the actuator, the shaft member having a opening disposed therethrough adjacent the second axial end, and wherein the sleeve member is sized having an axial length that is sufficient to permit access to the opening when the shaft member is positioned into the second position.

25. The valve apparatus as recited in claim 13 comprising a second fluid outlet and further comprising an insert disposed within the fluid chamber, the insert including a second valve seat and a fluid flow passage disposed therethrough that is in fluid flow communication with one of the fluid outlet or the second fluid outlet.

26. A valve apparatus for controlling fluid flow comprising:
a valve body having a fluid chamber disposed therein and including a fluid inlet and a fluid outlet in communication with the fluid chamber;
a poppet assembly movably disposed within the fluid chamber and having a one-piece construction comprising:

a poppet head positioned at one end of the poppet assembly and interposed between the fluid inlet and the fluid outlet;

a stem integral with the poppet head and extending axially a distance therefrom;

a flexible diaphragm integral with the stem and extending a distance radially therefrom to facilitate axial poppet head movement; and a flange integral with the flexible diaphragm and extending circumferentially therearound, the flange including a lip for providing a leak-tight seal with the valve body;

a valve seat disposed within the fluid chamber and interposed between the fluid inlet and the fluid outlet to control fluid flow through the fluid chamber by placement of the poppet head thereagainst;

an actuator housing connected to the valve body and including an actuator movably disposed therein, the actuator being connected with the poppet assembly to move the poppet head within the fluid chamber relative to the valve seat to control fluid flow; and a lock-out mechanism disposed adjacent the actuating housing for connecting with the actuator to fix the actuator and poppet assembly into a closed position with the poppet head positioned against the valve seat, the lock-out mechanism comprising:

a shaft member having a first end pivotably attached to the valve apparatus and that is positioned to connect with the actuator, the first end having a cammed surface to permit actuator movement and fluid flow through the valve apparatus when the shaft member is placed into a first position out of axial alignment with the actuator, and to prevent actuator movement and fix the poppet head against the valve seat when the shaft member is placed into a second position in axial alignment with the actuator, the shaft member having a second end opposite the first end; and a sleeve member disposed around the shaft member and axially movable relative to the shaft member to releasibly fix placement of the shaft member in the first and second positions.

27. The valve apparatus as recited in claim 26 further comprising:

a first intermediate member positioned adjacent the actuator and extending a distance axially therefrom; and a second intermediate member interposed between the first intermediate member and the shaft member.

28. The valve apparatus as recited in claim 27 wherein the second intermediate member includes a first end that is slidably disposed within an end of the first intermediate member opposite the actuator, and wherein a spring biasing means is interposed between the first and second intermediate members.

29. The valve apparatus as recited in claim 27 further comprising a spring interposed between the actuator and the first intermediate member, wherein when the shaft member is placed in the first position the spring biases the first intermediate member a distance away from the actuator.

30. The valve apparatus as recited in claim 26 wherein the shaft member further includes a radially projecting pin that is disposed within an axially extending groove in the sleeve member, the pin and groove operating to limit the extent of axial sleeve member movement relative to the shaft member.

31. A method for preventing the flow of fluid through a fluid outlet of a valve apparatus, the valve apparatus comprising a valve body having a fluid chamber disposed therein and including a fluid inlet and the fluid outlet in communication with the fluid chamber, a poppet assembly movably disposed within the fluid chamber interposed between the fluid inlet and the fluid outlet and including a poppet head, a valve seat disposed within the fluid chamber and interposed between the fluid inlet and the fluid outlet to control the flow of fluid through the fluid chamber by placement of the poppet head thereagainst, and an actuator attached to the poppet assembly to move the poppet head within the fluid chamber relative to the valve seat, the method comprising:

moving a shaft member that is pivotably attached to the valve apparatus from a first position where an end of the shaft member is free from connecting with the actuator to a second position where the end of the shaft member connects with and fixes placement of the actuator and poppet assembly within the valve apparatus to urge the poppet head against the valve seat; and releasibly fixing the shaft member in the second position, wherein the valve apparatus further comprises a sleeve that is slidably disposed around the shaft member and a spring disposed therein, the step of releasibly fixing comprising positioning an axial end of the sleeve against an adjacent surface of the valve apparatus.

32. The method as recited in claim 31 wherein during the step of moving, the shaft member is moved from the first position that is out of axial alignment with the actuator to the second position that is in axial alignment with the actuator.

33. The method as recited in claim 31 wherein the shaft member includes an opening through an end opposite the actuator, and further comprising the step of fixing the shaft member in the second position by placing an object into the opening that restricts movement of the sleeve in a direction towards the opening.

* * * * *